Feb. 16, 1932.　　S. J. LONERGAN　　1,845,027
THERMOSTAT MECHANISM
Filed Aug. 30, 1929　　2 Sheets-Sheet 1
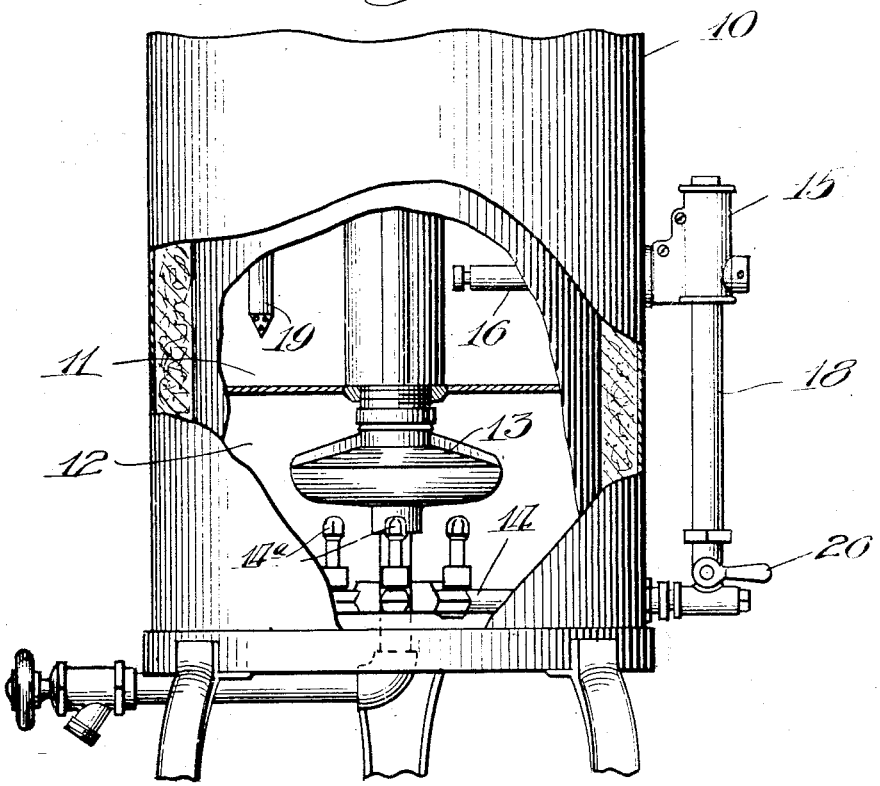
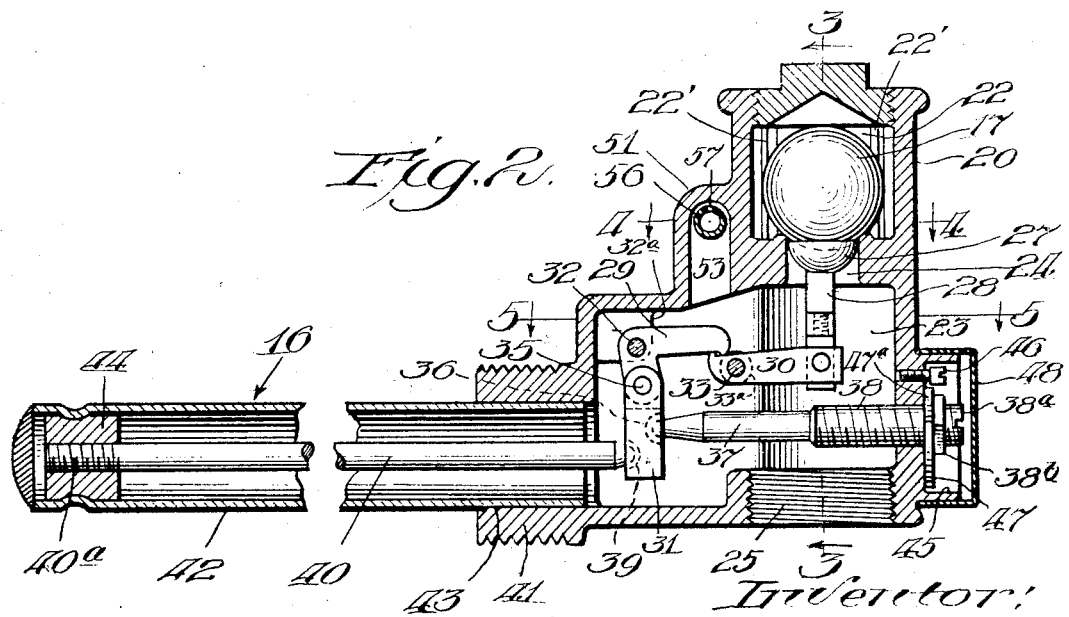

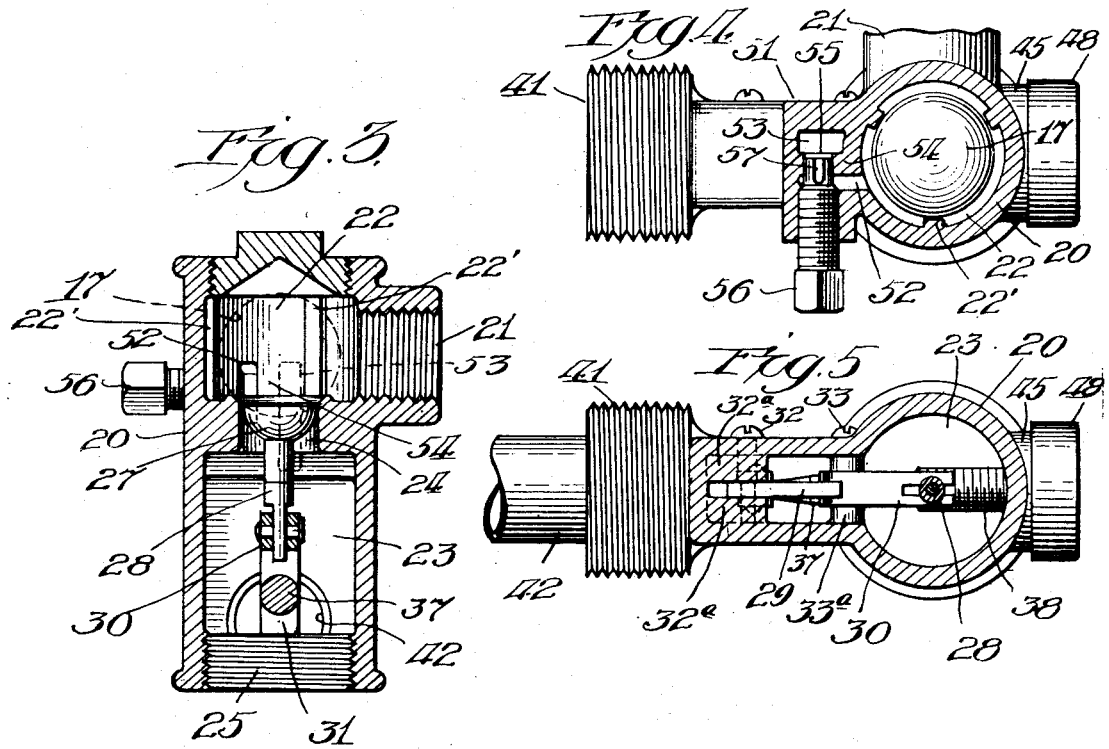
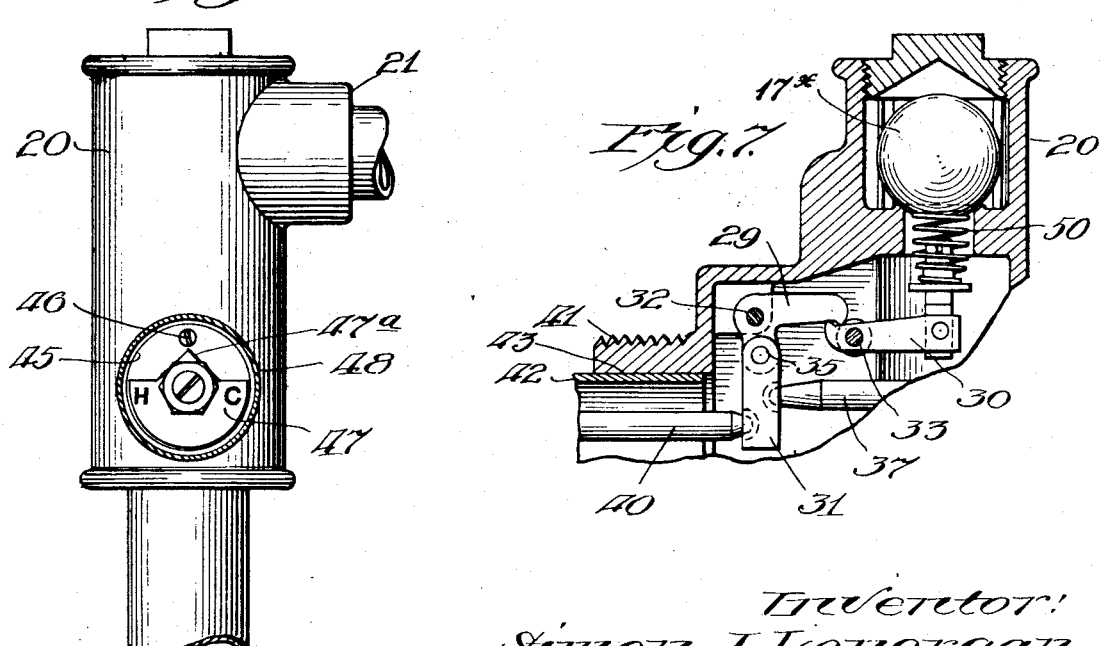

Patented Feb. 16, 1932

1,845,027

UNITED STATES PATENT OFFICE

SIMON J. LONERGAN, OF LA PORTE, INDIANA, ASSIGNOR TO BASTIAN-MORLEY COMPANY, OF LA PORTE, INDIANA, A CORPORATION OF INDIANA

THERMOSTAT MECHANISM

Application filed August 30, 1929. Serial No. 389,337.

My invention relates to thermostat mechanism and has to do particularly with mechanism of this character adapted to control the movement of a valve, or similar, element.

My thermostat invention is well adapted for use in connection with water heating apparatus and, to facilitate explanation of the same, I will refer to it in its application to water heating apparatus.

Both "snap-action" and "slow-closing" or "graduated-action" forms of thermostatic mechanism have come into general use in the water heating field for the flow-control of a combustible medium to a burner for bringing the temperature of the water in the storage tank to and maintaining it at a predetermined point. The particular conditions of use, the forms of heating means employed, etc., determine mainly which of these forms of thermostatic mechanism is employed in a particular appliance, all of which will be well understood by those familiar with this art.

From cost, production, maintenance and efficiency standpoints, it is highly desirable that both of the forms of thermostatic mechanism embody a minimum number of parts, which parts should be universally applicable to snap-action as well as graduated-action devices; and one of the objects of my invention is to provide such a universally-applicable mechanism. To this end, my invention contemplates the use of thermal elements and coacting levers which serve for the operation of both snap-action and graduated-action valve elements.

Another object is to provide thermostatic mechanism of a character adapted to operate with maximum efficiency over a short temperature range whereby, in its application to snap-action valve mechanism, the cutting-in and out of the combustible medium will take place more rapidly and over a comparatively short range thereby keeping the water at a more nearly uniform and predetermined temperature than has been possible with previously-employed structures of this character; and in its application to the graduated-action valve mechanism it is adapted to provide for shorter periods for cutting the combustible medium in "full" and for cutting it out to increase the heating efficiency of the appliance as a whole (the heating means being more efficient when on "full").

A further object of my invention is to provide mechanism of the foregoing character which is exceedingly compact in its entire make-up and which embodies a plurality of motion-multiplying levers pivotally supported in such a way that the main motion pivots or bearings are located out of the main path of the combustible medium passing through the mechanism wherefore foreign matter in the combustible medium will not collect on the pivots and bearings to cause sluggish movement of the levers. A particular advantage of this feature of my invention is that it insures free, positive-acting parts which insure a more exact flow-control of the combustible medium according to the temperature conditions desired to be maintained. To this end, I accomplish a very great motion multiplication with a series of three levers having only two pivotal connections to the body of the device. By reducing the pivotal points to two, I materially reduce the possibility of sluggishness and sticking in lever movement. Free-acting friction bearing surfaces are employed between certain of the levers thereby eliminating the use of links which not only simplifies the structure but also aids positive and free movement of the levers.

Other objects of my invention are to provide an improved system of motion-multiplying levers which are arranged for operation in series without lost motion; to provide such a system of levers, as above described, having a positive gravity-movement action; to provide a thermostatic mechanism which is simple in constructon and cheap to manufacture; to provide for the use of smaller and more compact thermal elements; and to provide a mechanism of the foregoing character adapted to be enclosed in a casing in such a way as to insure readiness and ease in assembly of the thermal-mechanism parts and levers.

Other objects and advantages will become apparent as this description progresses and by reference to the drawings wherein,—

Figure 1 is a fragmental elevational view, partially in section, showing one form of water heating apparatus with my invention applied thereto and adapted for graduated-action operation;

Fig. 2 is an enlarged vertical sectional view of the thermostatic mechanism shown in Fig. 1 and embodying my invention;

Fig. 3 is a transverse vertical sectional view taken substantially on line 3—3 of Fig. 2;

Fig. 4 is a horizontal sectional view taken substantially on line 4—4 of Fig. 2;

Fig. 5 is a horizontal sectional view taken substantially on line 5—5 of Fig. 2;

Fig. 6 is a partial elevational view of the thermostatic mechanism showing, more clearly the adjustment indicator structure; and Fig. 7 is a vertical sectional view similar to Fig. 2, but showing my invention associated with valve mechanism of the snap-action type.

It will be understood that while I have shown my invention in its adaptation to a particular form of water heating apparatus, yet I do not wish to be limited to such use because it is obvious that my invention has utility in connection with other forms of water heating apparatus and in other environments where the attainments of its advantages are found desirable.

Referring particularly to the water heating apparatus shown in Fig. 1, it comprises an insulating shell or casing 10 enclosing (in spaced relation) a storage tank 11 of conventional form. The walls of the casing 10 and tank 11 are extended downwardly beyond the bottom of the storage tank to form a combustion chamber 12 in which there is located a so-called spreader element 13 and burner 14. The combustible medium which is fed to the burner 14 may take the form of any suitable kind of gas.

As above explained, it is desirable for automatic control of the heating apparatus to provide some means to control the flow of the gas to the burner in accord with and as determined by the temperature of the water in the tank 11. My invention has to do particularly with thermostatic mechanism, indicated generally at 15, for controlling the flow of the gas directly by the temperature of the water in the tank 11. Generally speaking, this thermostatic mechanism includes a thermal unit 16 adapted to control, through a system of motion-multiplying levers, a valve 17 which controls communication between the gas source and the pipe 18 leading to the burner 14. The thermal unit 16 projects, preferably, into the lower part of the tank 11 adjacent the discharge end of the cold water inlet pipe 19 as illustrated in Fig. 1.

Referring specifically to the thermostat mechanism, the casing 20 (Fig. 2) is provided with a gas inlet 21 (Fig. 3) leading into an upper casing chamber 22 which communicates with a lower and larger casing chamber 23 through a partition opening 24 controlled by the ball valve 17. The bottom of the casing is provided with a gas outlet 25 which communicates with the pipe 18 leading to the burner 14. The flow of the gas through the pipe 18 and to the burner 14 may be cut off independently of the thermostatic mechanism by a suitable gas cock 26. The gas inlet 21 is connected to any suitable gas supply (not shown).

The wall of the partition-opening 24 is extended upwardly to a slight extent to provide a seat for the ball valve 17 and to provide an annular space around said seat for receiving and retaining dirt, sediment, etc., which may be carried along and deposited by the combustible medium flowing through the casing. The valve 17 is loosely supported for movement toward and from its seat by means of a member having a cup-shaped head 27 with a stem 28 fixed to and depending therefrom. This stem-head unit is adapted to be operated to open and close the valve 17 by thermally-controlled means which will now be described. The ball valve is guided vertically in its movements by guide lugs 22′ extending vertically along the adjacent wall of the upper chamber 22.

This operating means takes the form of three motion-multiplying levers arranged for operation in series and so coacting with each other that a very slight movement of the prime-moving thermal means effects a comparatively great and rapid vertical movement of the valve support and valve 17 sufficient to move the ball to or from its seat, dependent upon the direction and extent of movement of the prime-mover. These levers are located in the lower casing chamber 23 and they have but two pivotal connections with the casing 20. They are all so pivotally mounted and associated with the casing that their pivots and bearing points are located outside the main flow-path of the gas, or other combustible medium, through the casing, as will be readily observed in Fig. 2. Specifically, in the form shown in the drawings, I employ what I may term a primary lever 29, a secondary lever 30 and a table lever 31 so connected that movement of one lever will impart a multiplied movement to the other of these levers. The lower casing chamber 23 is extended laterally of the main gas flow-path (see arrow in Fig. 2); and the primary lever 29, which is of general L-shape is pivotally supported in the outward portion of this lateral extension by a pin 32 which passes through the lever adjacent the juncture of its L-legs. This lever is given both pivotal and lateral guidance and support by opposed pivot bosses 32ª which extend inwardly of the casing at the point where the pivot pin 32 passes therethrough (see Fig. 5). The secondary lever is pivotally supported by a suitable pin 33 at a point located inwardly of the primary pivot. This lever also is given lateral guidance and support by lugs or bosses 33ª extending inwardly of the opposite casing walls as best illustrated in Fig. 5. The free end (or the end opposite the pivot) of the secondary lever is pivotally connected to the valve support stem 28 whereby movement of this lever will impart movement to the valve as will be explained more in detail hereinafter. The pivoted end of the secondary lever 30 is extended outwardly (toward the primary lever) a slight distance beyond its pivot pin 33 and such end is curved upwardly with a hook-like bearing to provide a so-called roll-joint surface; and the free end of the primary lever 29, which is disposed above the pivoted end of the secondary lever, is similarly shaped but curved downwardly so as to provide a so-called roll-bearing which frictionally engages and interlocks with the bearing on the pivoted end of the secondary lever. In the movement of these levers, as will be explained, these joint surfaces, while only frictionally engaged, coact in such a way as to impart a desired positive, motion-multiplying movement to the levers.

With the primary lever mounted as above explained, its short L-leg extends downwardly into the lateral chamber-extension space and this leg is pivotally connected to one end of the table lever 31 by a pivot pin 35. The mid-part surface of this table lever which faces the main gas flow path is provided with a rounded depression 36 in which is seated the rounded end of an abutment or fulcrum member 37. This member 37 is adjustably supported by its stem part 38 screw threadedly engaging the opposite, or horizontally aligned, wall part of the casing 20. The other end of the table lever (opposite its pivotal connection with the primary lever) is provided with a rounded depression 39 which is engaged by the rounded end of a rod 40 which is formed of a metal having a low co-efficient of expansion, such as invar metal.

From the foregoing and by reference particularly to Fig. 2, it will be appreciated that with the rod 40 engaging the free end of the table lever, with the outer end of the table lever engaging the primary lever close to the latter's pivotal support, and with the long leg or arm of the primary lever engaging the secondary lever near to its pivot, a very slight inward movement of the rod 40 rocking the table lever about the adjustable abutment 37 will cause a greatly multiplied upward movement of the free or valve-supporting end of the secondary lever to move the valve 17 vertically upward from its seat and establish full-open communication through the thermostat to the burner device 14. Conversely, a very slight outward movement of the invar rod will permit the valve 17, by gravity, to move the levers so as to seat the valve and cut off the communication previously established. This movement will be free and rapid because the lever pivots, as well as the lever bearings are located out of the gas-flow path through the casing whereby such pivots and bearings will be kept clean and will not become "gummed" and sticky, which, if permitted, naturally would retard and hinder the gravity operation of the levers under the weight of the ball valve. The freeness and positiveness of this action is further provided for by the above multiplying arrangement in which there are used only three levers having but two pivotal connections with the casing. The foregoing arrangement including the friction bearing surfaces eliminates the use of links between the primary and secondary levers which not only greatly simplifies the structure but further aids in the freeness of the above described lever action.

Movement of the rod 40 (and the motion-multiplying levers) is accomplished by means of an expansible and contractible element to which the rod 40 is anchored. Specifically, the lower part of the casing 20 is extended laterally as at 41 and in this extension a tube 42 is securely fitted as at 43. This tube is formed of a metal having a high coefficient of expansion such, for example, as copper. The outer part of this tube has a fixed head part 44 into which the outer end 40ª of the rod 40 is screw-threaded. Heating, and consequent expansion of the tube 42 causes an outward movement of the rod 40 and a resultant movement of the motion levers wherein the valve 17 moves by gravity toward its seat. Cooling of this tube causes a reverse movement of the rod 40 and consequent opening of the valve 17.

Assuming that the thermostatic mechanism is associated with a storage tank of a water heating apparatus, as illustrated in Fig. 1, the operation is as follows: With the water in the storage tank 11 cold, as at the beginning of operation, the tube 42 is fully contracted (rod 40 moved to its full inward position) and the motion levers are in position holding the valve 17 full open, permitting a full flow of the gas from its source to the burner 14. When the burner 14 is lighted and the temperature of the water in the tank begins to rise, a corresponding expansion movement of the tube 42 takes place with a corresponding movement of the levers (gradual with the gradual heating of the water) until finally such tube has expanded (when the maximum desired water temperature is reached) to an extent wherein the free end of the secondary lever 30 has moved downwardly under the weight of the valve 17 sufficiently to seat the valve and cut off the direct flow of gas to the burner 14. Due to the motion-multiplying action of the levers 31, 29 and 30, the complete closing of the valve will take place upon a very small expansion movement of the tube 42. Consequently, the desired lever movement may be accomplished with a much smaller expansion tube than that necessarily used in connection with prior devices, and the period of bringing the burner 14 on "full" and cutting it off is considerably shortened.

The abutment 37 which has its threaded head adjustably mounted in the wall of the casing 20 opposite the table lever 31 serves as the means for predetermining the temperature of the water in the storage tank. Clockwise turning movement of the abutment (by its kerfed head 38ª) swings the pivoted end of the table lever inward, moving the normal position of the free end of the primary lever 29 downward and the normal position of the free end of the secondary lever upward thereby raising the normal position of the ball valve 17 so that the tube 42 will have to expand a greater extent to seat the ball valve 17. This adjustment raises the cutout point so that the water temperature is maintained at a higher point. When the adjustable abutment 38 is turned counterclockwise, the reverse of the foregoing action takes place; namely, the tube 42 will have to contract (water in the tank cool) to a greater extent before the levers 31, 29 and 30 are moved to sufficient extent to raise the valve 17 from its seat and cut in the gas from the main source to the burner 14.

To enable the user to more accurately determine the character and extent of the foregoing adjustment, I may employ an indicator structure such as that illustrated in Figs. 2 and 6. The lower part of the casing 20 opposite the extension 41 is provided with a hollow boss or extension 45 which serves, in part, as a housing for the projecting or kerfed end 38ª of the abutment 38. Within this extension, I provide an indicator pin 46 which also serves as a stop screw for an indicator plate 47 screw-threadedly mounted upon the projecting end 38ª of the abutment. This indicator plate, which is adjustably secured on the abutment by lock nut 38ᵇ, takes a semi-circular shape having a mid-pointer part 47ª which when aligned with the indicator pin 46 indicates a "medium" heat or temperature of the water. By reference to Fig. 6, it will be noted that the left side of the disk bears a marking indicating "Hot" and the opposite side of the disk bears a marking indicating "Cold." The disk (and abutment 38) may be rotated to the right until the edge of the disk strikes the stop screw thusly determining the limit or range of "hot" adjustment which may be made from any particular or original setting of the abutment 38. The foregoing is likewise true with respect to the "cold" adjustment when the abutment is turned in a counterclockwise direction. The indicator structure is covered by a cap 48 which slidingly slips over the extension 45 and which guards against accidental and unauthorized movement of the indicator disk 47.

The burner 14 is of a character adapted, when the main thermostat functions to cut off the supply of gas thereto, to burn with a pilot flame issuing from each of the burner tips or nozzles 14ª. That is, when the temperature of the water in the storage tank 11 is raised to the predetermined maximum and thermostat cutout point, the burner 14 will continue to burn but merely as a pilot. To accomplish this, I provide by-pass structure within the casing 20 which will now be briefly described. The upper part of the casing 20 is provided with a lateral hollow extension 51 which is provided with one chamber 52 which communicates with the inlet or ball chamber 22 and another chamber 53 which is in direct communication with the lower casing chamber 23 as best illustrated in Figs. 2 and 4. The sole communication between the by-pass chambers 52 and 53 is through a dividing wall 54 having an opening 55 controlled by an adjustable by-pass screw device 56. This screw threadedly engages the by-pass extension part 51 with its hollow inner end snugly seated in the dividing wall opening 55. The hollow inner end of this screw is slotted as at 57 thereby providing with the adjacent surface of the dividing wall 54 an orifice through which the by-pass chambers 52 and 53 communicate. By turning the by-pass screw 56 in or out the by-pass orifice will be made smaller or larger to determine the by-pass flow of gas from the main source through the upper valve chamber 22, the by-pass and the lower casing chamber 23 and connections leading to the burner 14.

In Fig. 7, I have illustrated the manner of converting the "graduated-action" arrangement (previously described) for "snap-action," specifically, in so converting the structure, I merely substitute a snap-action valve mechanism for the graduated-action mechanism shown in the previous Figs. 1 to 6, inclusive. Briefly, for the valve support head 27, I substitute snap-action valve mechanism which preferably takes the form of that shown and described in an application filed by Howard E. Ginther on January 24, 1928, Serial 249,092, for operating mechanism. The structure of Fig. 7 operates in the same manner as the structure of Fig. 2 except for the snap-action movement of the valve 17ˣ due, in part, to the action of the light spring 50 upon movement of the motion-multiplying levers. In this form, the by-pass is, preferably, closed and a suitable by-pass (not shown) is used to supply gas to any desired form of pilot light means (not shown) as will be well understood.

From the foregoing, it will be obvious that my invention provides several distinct advantages over prior thermostatic mechanisms of this character. More particularly, the structure is exceedingly compact and, while being simple in construction and cheap to manufacture, practical demonstration has shown that it gives maximum control efficiency. Movement of the levers in both operating directions is free and positive without drag due to the non-clogging, non-gumming, etc., of the lever pivots and bearings. The series arrangement of the levers, one associated with the other successively and adjacent the pivotal supports, makes possible a wide and rapid movement of the levers and the controlling valve upon a very slight contraction-expansion movement of the tube 42. A short temperature range is provided for by which the temperature of the medium to be controlled is maintained at more exactly the predetermined, desired temperature. In both the "snap-action" and "graduated-action" mechanisms my invention serves to keep the water at a more uniform temperature by causing the mechanism to act upon a minimum temperature drop, which serves to give a maximum hot water recovery for a given size tank. The motion-multiplying ability of the levers make possible the use of a shorter invar rod and, likewise, a shorter expansion tube 42 or a tube which need not have such a wide expansion-contraction range as has been practically necessary in thermostat devices heretofore devised; and this advantage is accomplished with a lesser number of levers, pivots and bearings which is very desirable in devices of this character from manufacturing, operating, maintenance, and cost stand-points.

While I have shown only one form of my invention (but in its adaptability to both graduated-action and snap-action valve mechanisms) it is to be understood that other changes in details and arrangement of parts may be made without departing from the spirit and scope of my invention as defined by the claims which follow.

I claim:

1. In thermostat mechanism, a casing having fuel flow connections; a valve in said casing for controlling the flow of fuel between said connections; means for actuating said valve including a thermo-element, a plurality of motion-multiplying levers, and a lever-actuating member controlled by said thermo-element, said levers including one lever pivotally supported between its ends by said casing and having a bearing element on one of its ends, a second lever pivotally supported between its ends and frictionally engaged by said bearing element of the one lever at a point between said one lever and the pivot of said second lever, a third lever, and an abutment member upon which said third lever is fulcrumed, said third lever being pivotally connected at one end to the end of said one lever opposite said bearing element, said lever-actuating member acting upon said third lever at the end part of the latter beyond said abutment member to move said third lever about said abutment member to move said one and second lever in succession, and a valve actuating element pivotally supported by said second lever at its end part opposite its point of engagement with said bearing element.

2. In thermostat mechanism, a casing having fluid-flow connections, a valve in said casing for controlling the flow between said connections, means for actuating said valve including a thermo-element, a plurality of successively-acting motion-multiplying levers, and a lever actuating member controlled by said thermo-element, said levers including one lever pivotally supported between its ends by said casing and having a bearing element on one end, a second lever pivotally supported between its ends by said casing and frictionally engaged at one side of its pivotal support by said bearing element, a valve actuating element pivotally supported by the opposite end part of said second lever, a third lever, and an adjustable support member upon which said third lever is fulcrumed, said third lever being pivotally connected at one end to the end of said one lever opposite said bearing element, said lever-actuating member acting upon said third lever to move the latter about said support member, to move said one and second levers and said valve actuating element in succession.

3. In thermostat mechanism, a casing, a valve in said casing, a motion multiplication lever system for moving said valve including a pair of disconnected levers superimposed in horizontal position and each pivoted between its ends to said casing, one of said levers having one end formed to provide a bearing adapted to engage the adjacent end of the other of said levers to one side of the latter's pivot, a third lever pivotally connected at one end to the end of said one lever of the pair opposite said bearing, a fulcrum element upon which said third lever seats, a member for imparting movement to said third lever about said fulcrum element, a thermo-element for controlling the movement of said member, and means connecting the end of said other lever opposite its bearing-engaged end with said valve.

4. In a device of the character described, a valve, a motion-multiplication lever system for operating said valve including a pair of super-imposed levers disposed in a generally horizontal position, a pivotal support between the ends of each said lever, each of said supports being laterally offset, one of said levers having one of its free ends downturned and the other of said levers having its adjacent end upturned providing coacting bearing surfaces, the latter of said levers being directly associated with said valve for opening and closing movements of the valve, a member pivoted to the end of said one lever opposite the latter's bearing end for imparting movement to said one lever, an actuator for said member, and a thermo-element controlling said actuator.

5. In thermostatic control mechanism, a valve, a motion-multiplication lever system for operating said valve including a plurality of levers arranged in series, two of said levers being pivotally connected together at their adjacent end parts and another of said levers being free with respect to said other two levers, a pivotal casing support for and between the ends of said two levers, a pivotal support for and between the ends of said other lever, the other end of said one lever of said two levers frictionally contacting one edge of said other lever to one side of its pivotal support to swing the latter about its pivotal support, said other lever acting on said valve, and thermal means for imparting motion to the other of said two levers thereby causing all said levers to move in succession one after the other.

6. In thermostat mechanism for a heating appliance, a casing, a valve in said casing, and means for operating said valve comprising a pair of levers superimposed in horizontal position and each pivotally mounted between its ends in said casing, a bearing element on the end of one of said levers to one side of its pivot which engages the other of said levers to one side of the pivotal connection of the latter, a third lever having one end pivotally connected to the end of one of the levers of said pair opposite said bearing element and having its other end free, a fulcrum element affording a motion support for said third lever, and thermal means for imparting motion to said third lever by application of pressure to the latter at its free end, and a valve actuating element supported by said other of said levers of said pair.

7. In thermostatic mechanism, a casing having inlet and outlet chamber portions, a valve in said casing controlling communication between said chamber portions, and means for operating said valve which comprises a lever associated with said valve at one end and pivotally supported by said casing at a point spaced slightly inward of its other end, a second lever pivotally supported between its ends by said casing and having one of its ends frictionally engaged with the end of said first lever adjacent the pivotal mounting of the latter, a third lever having one end pivotally connected to the other end of said second lever, an abutment element engaging the mid-part of said third lever, and a thermo-active element acting on the non-pivoted end of said third lever to impart motion to all said levers in succession.

8. In thermostatic mechanism, a casing having a direct-flow passageway therethrough, a valve located in said passageway for controlling the same, a motion-multiplication lever system for opening and closing said valve including a lever associated near one end with said valve and pivotally supported by said casing at a point between its ends and at a point remote from said direct-flow passageway, another lever pivotally supported between its ends by said casing at a point also remote from said direct-flow passageway and having one of its ends frictionally engaged with the end of said first lever adjacent the pivotal support of the latter for rocking the latter, a third lever mounted in said casing adjacent the pivotal support for said other lever and pivoted to said other lever to rock the latter about its pivotal support, a support member associated with said third lever, and a thermo-active element also associated with said third lever for rocking the latter about said support member.

9. In thermostatic mechanism, a casing having inlet and outlet chamber portions, a valve controlling communication between said chamber portions, and means for opening and closing said valve including a horizontally-disposed primary lever pivotally supported between its ends by said casing, a horizontally-disposed secondary lever pivotally supported between its ends by said casing and associated with said valve at one end, the other end of said primary lever and the adjacent end of said secondary lever being formed for coacting friction-bearing surfaces adapted to be superimposed and engaged with each other, a third lever pivotally associated with said primary lever to one side of the latter's pivotal support opposite its point of contact with said secondary lever, and means movable in one direction for imparting lateral swing motion to said third lever to swing the bearing end of said primary lever downward and said secondary lever and the valve associated therewith upward about the respective pivots of said levers to open said valve, said levers being adapted to move in opposite directions due to their own weight to open said valve when said means is moved in an opposite direction.

10. In thermostatic mechanism, a valve, a motion-multiplication lever system for operating said valve including a pair of levers one vertical and the other horizontal and pivotally connected together at their ends, a pivotal support for and between the ends of said horizontal lever of the pair, an adjustable support for the mid-portion of said vertical lever of the pair, a third and horizontally-disposed lever associated with said valve at one end and pivotally supported between its ends with its end opposite said valve frictionally engaged by the adjacent end of the horizontal lever of said pair, and thermal means engaging the non-pivotally connected end of said vertical lever of said pair for movement of said lever and said valve in succession.

11. In mechanism of the character described, a valve element, three successive levers for operating said valve, an independently adjustable support member freely engaged by the first of said levers and about which said first lever swings, the last lever being pivotally-supported between its ends and having one end operatively associated with said valve, the intermediate lever being pivotally supported between its ends and pivotally connected at one end to one end of the first lever, and also having its other end free and frictionally engageable with the end of the last lever opposite its valve-associated end, and means engaging the non-pivoted end of the first lever for moving it about its support member to move the other levers in succession.

12. In mechanism of the character described, a casing having inlet and outlet chambers, a valve controlling communication between said chambers, said outlet chambers being extended laterally of the main flow path therethrough, two laterally and vertically offset and horizontally-extending levers each independently and pivotally mounted between its ends in said outlet chamber extension, said levers having their adjacent end parts frictionally engaged for successive movement, and a third lever in said outlet chamber extension pivotally connected at one end to one of said two levers at the end of the latter opposite its said frictionally-engaged end, said third lever having its other end part connected with a prime mover, and an adjustable support for and between the ends of said third lever only, all said pivotal mountings and bearings being located in said same outlet chamber extension and at one side of said main path, and means associating the end of the other of said two levers opposite its frictionally-engaged end with said valve.

In testimony whereof, I have subscribed my name.

SIMON J. LONERGAN.